United States Patent
Rönneke et al.

(10) Patent No.: US 9,948,519 B2
(45) Date of Patent: Apr. 17, 2018

(54) SYSTEMS AND METHODS FOR ESTABLISHING A PACKET DATA NETWORK CONNECTION FOR A WIRELESS COMMUNICATION DEVICE

(71) Applicant: Telefonaktiebolaget L M Ericsson (publ), Stockholm (SE)

(72) Inventors: Hans Bertil Rönneke, Kungsbacka (SE); Lars-Bertil Olsson, Angered (SE)

(73) Assignee: TELEFONAKTIEBOLAGET LM ERICSSON (PUBL), Stockhom (SE)

( * ) Notice: Subject to any disclaimer, the term of this patent is extended or adjusted under 35 U.S.C. 154(b) by 252 days.

(21) Appl. No.: 14/826,737

(22) Filed: Aug. 14, 2015

(65) Prior Publication Data

US 2017/0048112 A1    Feb. 16, 2017

(51) Int. Cl.
| | |
|---|---|
| H04L 12/24 | (2006.01) |
| H04L 29/08 | (2006.01) |
| H04W 88/02 | (2009.01) |
| H04W 76/02 | (2009.01) |
| H04W 4/00 | (2018.01) |
| H04W 60/00 | (2009.01) |
| H04W 8/06 | (2009.01) |

(52) U.S. Cl.
CPC ............ *H04L 41/12* (2013.01); *H04L 67/12* (2013.01); *H04W 76/022* (2013.01); *H04W 88/02* (2013.01); *H04W 4/005* (2013.01); *H04W 8/06* (2013.01); *H04W 60/00* (2013.01)

(58) Field of Classification Search
CPC ...... H04L 41/12; H04L 67/12; H04W 76/022; H04W 4/005
See application file for complete search history.

(56) References Cited

U.S. PATENT DOCUMENTS

| | | | |
|---|---|---|---|
| 8,514,756 B1 * | 8/2013 | Ramachandra | H04W 76/002 370/310 |
| 2012/0294236 A1 | 11/2012 | Watfa et al. | |
| 2014/0302812 A1 * | 10/2014 | Yu | H04W 60/00 455/406 |

FOREIGN PATENT DOCUMENTS

WO    2013191610 A2    12/2013

OTHER PUBLICATIONS

3GPP TS 24.301 v13.2.0 (Jun. 2015); 3rd Generation Partnership Project; Technical Specification Group Core Network and Terminals; Non-Access-Stratum (NAS) protocol for Evolved Packet System (EPS); Stage 3 (Release 13); 386 pages.
3GPP TS 24.008 V13.2.0 (Jun. 2015); "3rd Generation Partnership Project; Technical Specification Group Core Network and Terminals; Mobile radio interface Layer 3 specification; Core network protocols; Stage 3 (Release 13)"; Jun. 2015; 718 pages.

(Continued)

*Primary Examiner* — Sulaiman Nooristany
(74) *Attorney, Agent, or Firm* — Rothwell, Figg, Ernst & Manbeck, p.c.

(57) ABSTRACT

Embodiments are directed to establishing only a single PDN connection for a CIoT device using, for example, minimum NAS signaling and default parameters in the serving node. Thus, the existing session management signaling from the CIoT device may be eliminated, and instead the core serving node may establish a single PDN connection or PDP context based on default values, subscription information, and other information locally available in the serving node or available in the network when the CIoT device attaches to the network.

32 Claims, 13 Drawing Sheets

(56) References Cited

OTHER PUBLICATIONS

3GPP TR 23.720 V0.0.0 (Jul. 2015); "3rd Generation Partnership Project; Technical Specification Group Services and System Aspects; Architecture enhancements for Cellular Internet of Things; (Release 13)"; Jul. 2015; 55 pages.
SA WG2 Meeting #110; Jul. 6-10, 2015, Dubrovnik, Croatia, Intel, TR 23.720 Scope, "Proposal"; 1 page.
3GPP TR 45.820 V1.3.1 (Jun. 2015); "3rd Generation Partnership Project; Technical Specification Group GSM/EDGE Radio Access Network; Cellular System Support for Ultra Low Complexity and Low Throughput Internet of Things; (Release 13)"; Jun. 2015, 271 pages.
3GPP TS 23.401 V13.3.0 (Jun. 2015), 3rd generation partnership project: Technical specification group services and system aspects; general packet radio service (GPRS) enhancements for evolved universal terrestrial radio access network (E-UTRAN) access (Release 13), 324 pages.
Huawei, H., S2-152341, SA WG2 Meeting #110, Jul. 6-10, 2015, Dubrovnik, Croatia, "Simplification of MM and SM procedures for CIoT," 6 pages.
Ericsson, S2-152975, SA WG2 Meeting #110-AH, Aug. 31-Sep. 3, 2015, Sophia Antipolis, France, "Setup of CIoT PDN connections with minimum NAS," 6 pages.
International Search Report and Written Opinion issued for application No. PCT/EP2016/064405, dated Aug. 5, 2016, 17 pages.

\* cited by examiner

SYSTEMS AND METHODS FOR ESTABLISHING A PACKET DATA NETWORK CONNECTION FOR A WIRELESS COMMUNICATION DEVICE

TECHNICAL FIELD

Aspects of this disclosure relate to establishing a packet data network (PDN) connection for a wireless communication device (WCD).

BACKGROUND

In a wireless communications network, wireless communication devices (WCDs) communicate with one or more core networks (CNs) via one or more Radio Access Network(s) (RANs). A Radio Access Network (RAN) covers a geographical area which is divided into cell areas, with each cell area being served by a base station (BS). In some RANs, the base station is called "NodeB" or "B node" or evolved NodeB (eNB). The base stations communicate via an air interface with WCDs within range of the base stations.

A WCD can be any device that has the capability to communicate wirelessly. Typically, the WCDs that connect to a cellular wireless communications network are smartphones, tablets, phablets, computers. However, it is expected that in the near future many things (e.g., household appliances, meters, vending machines, cars, buildings, etc.) will include WCDs—i.e., the things will be given the capability to wirelessly transmit data via a wireless network (e.g., a $3^{rd}$ Generation Partnership Project (3GPP) 4G cellular network). Such things that have WCD capability are sometimes referred to as "cellular Internet-of-Things (CIoTs)" devices or just "Internet-of-Things (IoTs)" devices or "machine type communication (MTC)" devices or Machine-to-Machine (M2M) devices.

A 3GPP, Long Term Evolution ("LTE") core network may include a core serving node (CSN) (i.e., an apparatus that provides network services to a WCD, such as, for example, an apparatus that implements one or more of: a Mobility Management Entity (MME), a serving GPRS support node (SGSN), an SGW, a PGW, a CIoT Serving Gateway Node (C-SGN)—a C-SGN is a logical entity that supports only the necessary functionality required for CIoT use cases—see 3GPP TR 23.720.0.1.0). The core network may also include a Home Subscriber Server (HSS) and a separate gateway node if the CSN does not implement gateway functionality or for roaming WCDs. The gateway node provides connectivity for the WCDs of the communication network to one or more external Packet Data Networks (PDNs). Some WCDs may have simultaneous connectivity with more than one network gateway node for accessing multiple PDNs. The network gateway node may be, for example, a Gateway GPRS Support Node (GGSN) or a PDN Gateway (PGW). Typically the network gateway provides PDN connectivity by creating a PDN connection for a radio terminal. The PDN connection may be requested by the WCD, for example, by sending a message to a core network node (e.g., MME). 3GPP WCDs use a protocol between the WCD and the CN called Non-Access Stratum (NAS). The NAS protocol is described in 3GPP TS 24.301 and 3GPP TS 24.008.

SUMMARY

CIoT devices may be expected to be ultra-low cost, low complexity, battery operated (e.g., up to 10 years on a battery), and/or use very low bitrate communication, sometimes on specialized radio protocols. In the 3GPP Evolved Packet System (EPS) data radio bearers (DRBs) are used to transmit user data. It has been proposed to extend the EPS to also use signaling radio bearers (SRBs) to transmit CIoT small data (according to TR 23.720 v0.1.0) for example using NAS containers. That could for example reduce the complexity for some CIoT device implementations not having to support DRBs. However, also the complexity and size of the NAS protocol stack in total is quite large. The amount of information sent over the radio interface when the NAS protocol is used is also quite large, which is an issue for the low-bitrate radio interfaces used by CIoT devices. When the NAS protocol was designed, the special requirements for CIoT communication were not considered. Thus, for CIoT devices it is desirable for the NAS "footprint," or NAS stack, in the device to be kept as small as possible in terms of memory size and with as low complexity as possible. It is also desirable that registration/deregistration to the network and establishment/removal of the PDN connection can be done with a minimum amount of signaling and amount of data conveyed as part of the signaling. For example, less radio resources of the low bitrate radio (e.g., Narrow Band radio) and less power is consumed in a CIoT device if the signaling and total transferred number of bits are kept to a minimum.

Thus, there exists a need to both reduce the size of the NAS messages as well as the number of NAS messages that a CIoT device must use to communicate over a 3GPP network. For example, in order to reduce the size of NAS messages, several information elements in the different NAS messages may be omitted for CIoT devices. Additionally, certain NAS messages may not be needed for CIoT devices and thus may be completely removed from the software implementing the NAS stack in the CIoT device.

In some environments, it may be assumed that a CIoT device only needs a single PDN connection. Accordingly, some embodiments of the present disclosure include a mechanism to establish only a single PDN connection for a CIoT use case with minimum NAS signaling by, for example, using an implicit PDN connection establishment based on default parameters in the serving node. Thus, the existing session management signaling from the CIoT device may be eliminated, and instead the core serving node may establish a single PDN connection or PDP context based on default values, subscription information, and other information locally available in the serving node or available in the network when the CIoT device attaches to the network. Such mechanisms can be applied for PDN connections of an "IP type" and "non IP type." It may also be used in combination with an attach procedure where no default PDN connection is established at attach (e.g. as described in TR 23.720 v0.1.0 clause 6.11.1.2) e.g., for use of SMS services only, if a default PDN connection needs to be established at a later stage. For example a CIoT device for surveillance, that periodically once a day sends a watch-dog SMS to an application server (to indicate that the device is working), and that is equipped to start sending video data when an alarm event happens. Since that may typically in some use cases happen very rarely, it may be beneficial to only use a PDN connection when really needed and not waste network resources for PDN connections in the operator network otherwise. Such a PDN connection may for CIoT devices using a minimized NAS stack according to this invention be established "on demand" using a specific and small NAS message.

The accompanying drawings, which are incorporated herein and form part of the specification, illustrate various embodiments.

BRIEF DESCRIPTION OF THE DRAWINGS

The accompanying drawings, which are incorporated herein and form part of the specification, illustrate various embodiments.

DETAILED DESCRIPTION

Figure 1:
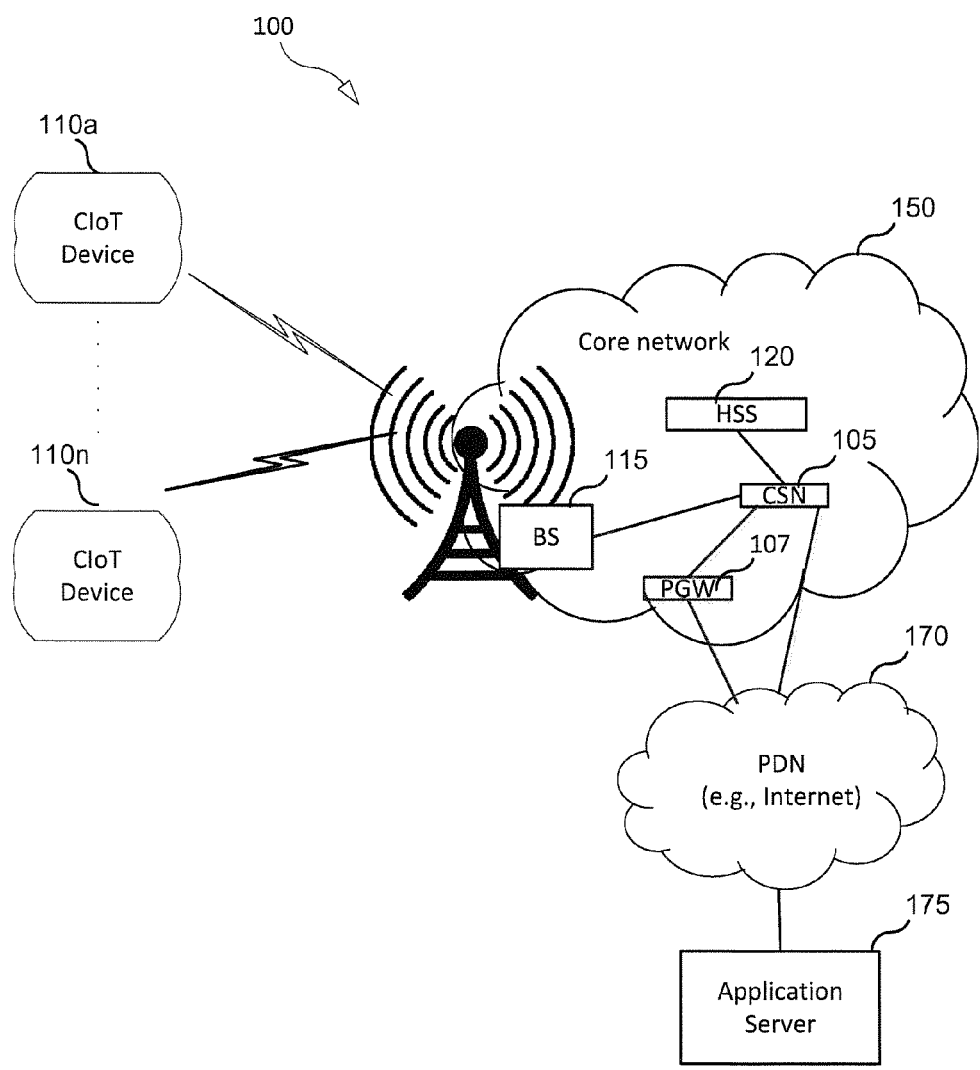
FIG. 1 is a block diagram of a communication network, according to some embodiments.

FIG. 1 is a block diagram of a communication network 100, according to some embodiments. The communication network 100 may be an Evolved Packet System (EPS) based system. It should be appreciated that although FIG. 1 shows a communication network 100 in the form of an EPS based system, the example embodiments disclosed herein may also be utilized in connection with other wireless communication systems comprising nodes and functions that correspond to the nodes and functions of the system in FIG. 1.

As shown in FIG. 1, communication network 100 includes one or more WCDs 110 in the form of CIoT devices 110a-n. As described above, a CIoT device may include or be connected to any type of object (e.g., microwave, climate control system, light bulb) and having a wireless terminal that enables communication with the core network (CN) 150 via the base station (BS) 115. For example, a CIoT device 110 may be connected to a parking meter or microwave oven using an embedded cellular module that includes, for example, a transmitter, receiver, antenna, etc. that enables the CIoT device 110 to communicate with a BS 115. FIG. 1 further shows that BS 115 may serve multiple CIoT devices 110a-n.

A core serving node 105 ("CSN") is located in core network 150. Where core network 150 is a LIE network, CSN 105 may comprise an Evolved Packet Core (EPC) Mobility Management Entity (MME). CSN 105 may further comprise one or more of a Serving Gateway (SGW) and/or a PDN Gateway (PGW).

The Mobility Management Entity (MME) is a control-node for the EPS based core network 150. It is responsible for idle mode WCD 110 tracking and paging procedures including retransmissions. It is involved in the bearer activation/deactivation process and is also responsible for choosing a SGW for a WCD 110 at the creation of the default PDN connection at the initial attach and at time of intra-LTE handover involving Core Network (CN) node relocation. It is responsible for authenticating the user (by interacting with the home subscriber server (HSS)).

The Non-Access Stratum (NAS) signaling is used between the WCD 110 and the MME, and the MME is also responsible for generation and allocation of temporary identities to WCDs 110. The MME checks the authorization of the WCD 110 to camp on the service provider's Public Land Mobile Network (PLMN) and enforces WCD 110 roaming restrictions. The MME is the termination point in the network for ciphering/integrity protection for NAS signaling and handles the security key management. Lawful interception of signaling is also supported by the MME. The MME also provides the control plane function for mobility between LIE and 2G/3G access networks with the S3 interface terminating at the MME from the SGSN. The MME also terminates the S6a interface towards the home HSS for WCDs 110.

The Serving Gateway (SGW) routes and forwards user data packets, while also acting as the mobility anchor for the user plane during inter-eNB handovers and as the anchor for mobility between LTE and other 3GPP technologies (terminating S4 interface and relaying the traffic between 2G/3G systems and PGW). For idle state WCDs 110, the SGW terminates the downlink data path and triggers paging when downlink data arrives for the WCD 110. It manages and stores WCD 110 contexts, e.g., parameters of the GTP bearer service (e.g. for IP traffic), network internal routing information. It also performs replication of the user traffic in case of lawful interception.

The PDN Gateway (PGW) is a network gateway node that provides connectivity for the WCD 110 to one or more external Packet Data Networks (PDNs) 170 (e.g., the Internet, private enterprise networks, etc.) by being the point of exit and entry of traffic for the WCD 110. A WCD 110 may have simultaneous connectivity with more than one PGW for accessing multiple PDNs 170. However, as explained in detail below, for at least some CIoT devices 110 it is assumed that only one PDN connection is required. The PGW allocates IP address(es) to the WCD 110, performs policy enforcement, packet filtering for each user, charging support, lawful Interception and packet screening. Another key role of the PGW is to act as the anchor for mobility between 3GPP and non-3GPP technologies such as WiMAX and 3GPP2 (CDMA 1x and EvDO). FIG. 1 further shows an application server 175 in PDN network 170 that may exchange messages and data with the WCDs 110 in connection with a particular application or service.

Core network 150 may further include a Home Subscriber Server (HSS) 120. The HSS is a database that contains user-related and subscriber-related information. It also provides support functions in mobility management, call and session setup, user authentication and access authorization.

A WCD generally may always have at least one PDN connection, referred to as a "default PDN connection." Thus, when a WCD attaches to the LTE core network 150, it always gets a default PDN connection. In LTE it is mandatory for a WCD to establish a PDN connection as part of the attach procedure. If a PDN connection for some reason cannot be established, e.g. SGW/PGW node failures, the attach request will not be successful.

In order to initiate an attach procedure to register with core network 150, a WCD may transmit an "Attach Request" message to a node of the core network 150 (e.g., CSN 105). The Attach Request message is an Evolved Packet System (EPS) Mobility Management (EMM) message. The Attach Request message may comprise a variety of information elements, including "Protocol discriminator," "Security header type," "Attach request message identity," "EPS attach type," "NAS key set identifier," "EPS mobile identity," "UE network capability," and a "ESM message container." In some embodiments, the WCD transmits the Attach Request to CSN 105 by generating an RRC Connection Setup Complete message having an TB that contains the Attach Request message and transmitting the RRC Connection Setup Complete message to BS 115, which then forwards the Attach Request to the CSN 105. In some embodiments, prior to sending the RRC Connection Setup Complete message, the WCD first sends to BS 115 an RRC Connection request and receive from the BS an RRC Connection Setup response message.

Additionally, in order to establish a PDN connection, a WCD may transmit a "PDN Connectivity Request" message to the network 150. The PDN Connectivity Request is an EPS Session Management (ESM) message. The PDN Connectivity Request message may comprise a variety of information elements, including a "Protocol discriminator," an "EPS bearer identity," a "Procedure transaction identity," a "PDN connectivity request message identity," a "Request type," and a "PDN type." If the PDN connectivity request message is accepted by the network 150, then a default EPS bearer context activation procedure is initiated.

In the current EPS system, a PDN Connectivity Request message piggy backed onto the initial Attach Request message from the WCD. In particular, the ESM message container information element in the Attach Request may transfer a single ESM message, such as the PDN Connectivity request. Thus, the WCD may transmit the Attach Request message and PDN Connectivity Request message to the network 150 within the same message container. Likewise, in the current EPS system an "Activate default EPS bearer context accept" NAS message indicating a successful PDN connection establishment is piggy backed onto the "Attach Accept" message sent from the network 150 to the WCD (indicating the WCD's successful attach to the network 150) in the ESM message container of the Attach Accept message.

In some environments, it is assumed that a CIoT device 110 needs only one single PDN connection. Thus, in order to minimize the complexity, memory size, processing requirements and data overhead requirements for CIoT devices 110 when using the NAS protocol, the CSN 105 (e.g., MME or C-SGN) may create the default PDN connection on behalf of the CIoT device 110 at or after the Attach procedure. In particular, the CSN 105 may use default parameters or subscription information locally stored at the CSN 105 or somewhere in the network 150 for the establishment of the PDN connection in response to receiving an Attach Request message from the CIoT device 110. The default parameters may comprise, for example, several of the information elements included in a PDN Connectivity Request, such as, for example, EPS Bearer Identity, a PDN Type, Protocol Configuration Options, Access Point Name, etc. For example, in some embodiments, the default parameters may comprise a default EPS Bearer identity. Accordingly, the NAS message from the WCD 110 to the CSN 105 may be removed from the CIoT device 110, thereby reducing the amount of overhead data communicated over the radio. Additional NAS messages relating to EPS Session Management (ESM) procedures handling the PDN connection may be removed from the CIoT device's 110 protocol stack and instead be handled in the network 150 by the CSN 105.

Figure 2:
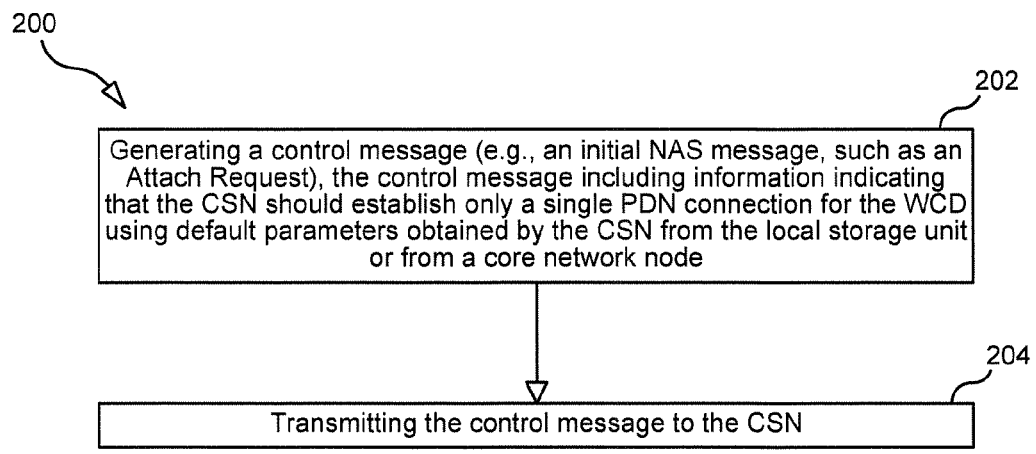
FIG. 2 is a flow chart illustrating a process performed by a wireless communication device, according to some embodiments.

FIG. 2 is a flow chart illustrating a process performed by WCD 110.

In step 202, the WCD 110 generates a control message (e.g., an initial NAS message, such as, for example, an Attach Request), the control message including information indicating explicitly or implicitly that the CSN 105 should establish only a single PDN connection for the WCD 110 using default parameters obtained by the CSN 105 from its local storage unit or from a core network 150 node. In some embodiment, the control message includes information indicating that a single PDN connection, e.g, a single PDC connection with single QoS or single QCI property (a.k.a., "CIoT PDN connection"), shall be established using default parameters obtained by the CSN 105 from its local storage unit or from a core network 150 node. That is, for example, the created CIoT PDN connection shall have only one bearer and no dedicated bearers should be created by the core network 150.

In step 204, the WCD 110 transmits the control message to the CSN 105. For example, as described above, the WCD may transmit the control message to the CSN by transmitting to BS 115 an RRC message (e.g, RRC Connection Setup Complete) that includes the control message. As described below, the WCD 110 may have a transceiver and a data processing system with a NAS protocol layer for generating and transmitting the Attach Request message to the CSN 105, e.g., via a BS 115 over a radio interface.

As described above, the control message may be an Attach Request message. As also described above, a PDN Connectivity Request message or other EPS Session Management (ESM) message may piggyback onto the Attach Request message, e.g., in the ESM Message Container of an Attach Request message. However, according to embodiments of the present disclosure, in order to reduce the NAS overhead of CIoT devices, the ESM message container may be eliminated or otherwise removed from the Attach Request message sent from WCD 110 to implicitly instruct the CSN 105 to establish a default PDN connection for the WCD 110. Thus, according to some embodiments, the Attach Request message in step 202 does not include an ESM Message Container.

Alternatively, in some embodiments, the Attach Request message may have an ESM Message Container that contains no content. Thus, if the ESM Message Container of an Attach Request message is missing or empty, no ESM message (e.g., a PDN Connectivity Request message) may be included in the ESM Message Container and thus piggybacked into the Attach Request message, thereby reducing the overhead in the NAS stack in the WCD 110. Accordingly, when the CSN 105 receives the Attach Request message from WCD 110, the absence of the ESM Message Container or an empty ESM Message Container may indicate to the CSN 105 that it should establish only a single PDN connection for the WCD 110 using default parameters.

In other embodiments, the Attach Request message transmitted from the WCD 110 does not contain a PDN Connectivity Request message included in the ESM Message Container. In other embodiments, the Attach Request message includes a minimal PDN Connectivity Request message included in the ESM Message Container. Such a minimal PDN Connectivity Request message can be a completely new ESM message with a limited set of parameters compared to the existing PDN Connectivity Request message, or it can be the existing PDN Connectivity Request message with some mandatory information elements and parameters omitted. At least one or more of the following information elements (Ms) may be non-present or omitted: Protocol discriminator, EPS bearer identity, Procedure transaction identity, Request type, PDN type. The minimal PDN Connectivity Request may also not include one or more of the following Ms: Access Point Name, Protocol Configuration Options, Device Properties, ESM Information Transfer Flag.

In some embodiments, a new PDN related information element may be added to the Attach Request message to specify a PCO or other required information of a PDN Connectivity Request message that has to be conveyed from the WCD 110 to the CSN 105. Accordingly, when the CSN 105 receives the Attach Request message from WCD 110, the absence of a piggybacked PDN Connectivity Request message or the presence of a new PDN related information element or other information element may indicate to the CSN 105 that it should establish only a single PDN connection for the WCD 110 using default parameters and potentially some parameters conveyed in the Attach Request message.

In other embodiments, the Attach Request message of step 202 comprises an information element (e.g., the EPS Attach Type, UE network capability, etc) containing the information indicating that the CSN should establish a single PDN connection using local information in the CSN. This information element may be a new value of an existing information element defined in Table 8.2.4.1 of 3GPP TS 24.301 V13.2.0 or it may be a new information element not yet defined in TS 24.301 (e.g., on the WCD capability). In some embodiments, the Attach Request message of step 202 comprises an information element containing protocol configuration option parameters (e.g., configuration parameters, error codes, messages, events, etc.)

For example, in instances where a WCD 110 needs to establish a PDN connection, the EPS Attach Type information element (or other IE) in the Attach Request message may be set to a new EPS Attach Type value, such as "CIoT-attach," "CIoT PDN," or the like. Additionally, the EPS attach type information element in the Attach Request message may be set to a new attach type such as "Single-PDN," indicating that only one PDN connection (e.g., a default PDN connection) using default values in the CSN should be established for a particular CIoT device or WCD 110. Thus, the EPS attach type value contained within the EPS attach type information element indicates to the CSN 105 that it should establish a single (e.g., default) PDN connection using default parameters.

In some embodiments, the information included in the Attach Request message indicating that the CSN 105 should establish a single PDN connection for the WCD 110 consists of a flag. For example, Attach Request may include an information element consisting of an indicator that indicates to the CSN 105 that it should establish only a single PDN connection for the WCD 110 using default parameters.

Figure 3A:
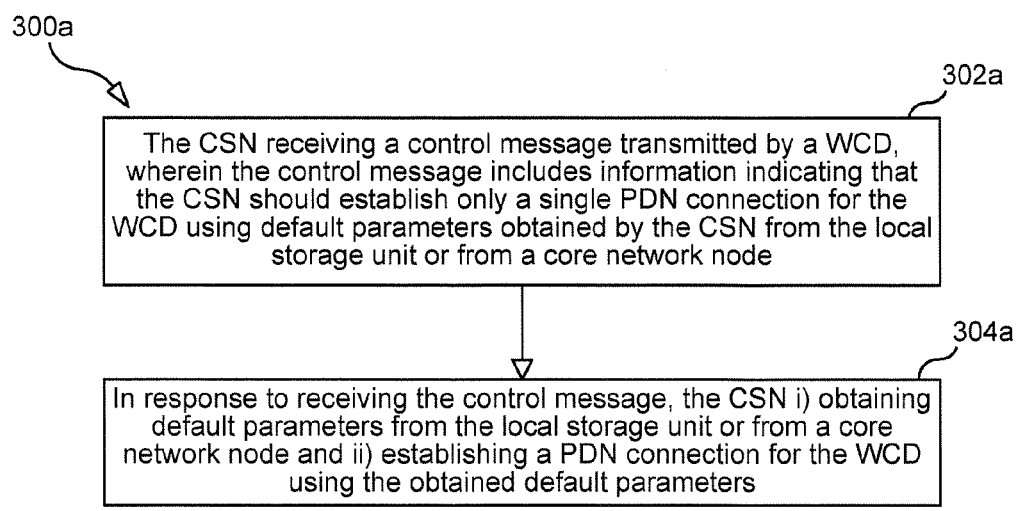
FIG. 3A is a flow chart illustrating a process performed by a core serving node, according to some embodiments.

FIG. 3A is a flow chart illustrating a process 300a, according to some embodiments, that is performed by a core serving node (CSN). In some embodiments, the CSN 105 may comprise a Mobility Management Node, such as a MME. In other embodiments, CSN 105 may comprise a MME and a SGW. Additionally, in other embodiments, CSN 105 may comprise a MME, a SGW, and a PGW. In other embodiments, CSN is a single entity C-SGN implementing the combined functionalities of a MME, a SGW and a PGW.

In step 302a, the CSN 105 receives a control message (e.g., an initial NAS message, such as an Attach Request) transmitted by a WCD 110, wherein the control message includes information indicating that the CSN 105 should establish only a single PDN connection for the WCD using default parameters obtained by the CSN from its local storage unit or from another node in core network 150. In some embodiments, the control message may be transmitted from the WCD 110 to the CSN 105 via BS 115 (as explained above the control message may be contained within an RRC message). In some embodiments, the CSN 105 shall establish a single PDN connection for the WCD using mostly default parameters obtained by the CSN from its local storage unit or from another node in core network 150, but where one or more parameters may be received by the CSN 105 as part of the control message or an embedded ESM message if or when the WCD 110 need to have a PDN connection with some characteristic different from what default parameters in the CSN 105 can accomplish.

In step 304a, in response to receiving the control message, the CSN 105 i) obtains default parameters from the local storage unit or from a core network node and ii) establishes a only single PDN connection for the WCD 110 using the obtained default parameters. In some embodiment, the single PDN connection created is also a single QoS/QCI PDN connection (i.e., a CIoT PDN connection). Hence the CSN 105 may mark the PDN connection, e.g. in its context information, as single QoS or single QCI and refrain from creating any dedicated bearers for the PDN connection.

As described above in connection with step 202 of FIG. 2, the control message may be an Attach Request message and the Attach Request message may: i) not include an ESM Message Container, ii) include an ESM Message Container that contains no content, iii) not include a PDN Connectivity request message, iv) include a minimal PDN Connectivity Request message, v) not include a PDN type or other information element of a PDN Connectivity request message, and/or vi) include an information element (e.g., the EPS Attach Type, UE network capability, other WCD capabilities, etc) containing the information indicating that the CSN should establish the PDN connection using default parameters. In some embodiments, the information included in the Attach Request message indicating that the CSN 105 should establish the PDN connection for the WCD 110 consists of a flag, which may comprise an indicator e.g. a flag or a one-bit indicator.

In some embodiments, the CSN 105 may comprise a local storage unit that includes a database of default PDN connectivity parameters. Upon receiving the control message, the CSN 105 may use a WCD 110 identifier contained in the control message to look up in a local database default PDN connectivity parameters associated with the WCD identifier. Alternatively, the CSN 105 may use WCD 110 identifier or other parameters contained in the control message to look up default PDN connectivity parameters in another node in core network 150, such as, for example, HSS. For example, the CSN may send to the HSS a data query including an identifier for identifying the WCD, which HSS, in response to the query, transmits to the CSN subscription information associated with the identified WCD, which subscription information includes the default PDN connectivity parameters that the CSN uses to establish the PDN connection.

To establish a PDN connection, the CSN 105 may initiate a procedure to establish a default bearer by, for example, transmitting a Create Session Request message. In embodiments where the CSN 105 comprises a MME, SGW, and PGW, the MME may provide a Create Session Request message comprising one or more of the obtained default PDN connectivity parameters to the SGW and PGW via a S11 interface according to 3GPP TS 23.401 v13.3.0 clause 5.3.2.1 "E-UTRAN Initial Attach", steps 12 to 16.

Alternatively, in embodiments where the CSN 105 is a MME, or in a roaming case where the C-SGN must forward the request to a second PGW, the CSN 105 may send a Create Session Request message via a S5 or S8 interface to a PGW according to 3GPP TS 23.401 v13.3.0 clause 5.3.2.1 "E-UTRAN Initial Attach", steps 13 to 15, with the Create Session Request message comprising one or more of the obtained default PDN connectivity parameters. The Create Session Request message format is as defined in 3GPP TS 29.274. However, a new "CIoT PDN," "CIoT-attach," "CIoT," or "Single-PDN" indication or similar indication may be included in the Create Session Request message to the PGW in order to ensure that the PGW is aware that, for example, the session creation is generated in the CSN 105 and not by the WCD 110, and/or that the WCD 110 uses a single PDN connection only. Accordingly, the PGW shall not create any second or dedicated bearers in response to receiving a Create Session Request message for a "CIoT PDN," "CIoT-attach," "CIoT," or "Single-PDN" or similar marked PDN connection.

In response to the Create Session Request message, the C-SGN or the PGW may provide or transmit a Create Session Response to the MME or CSN 105. In some embodiments, the PGW may include a "CIoT PDN", "CIoT-attach," "CIoT," "Single PDN," "Implicit PDN," "CN generated PDN," "Create-PDN" indication, or the like, in the Create Session Response to indicate the PGW's support for the alternate procedure with a single PDN connection. For example, the alternative procedure may signify support from the PGW that no dedicated bearers or modification of the bearer for the WCD 110 should be initiated. In some embodiment the C-SGN or the PGW may in response to the Create Session Request message, establish a direct forwarding path, e.g., a point-to-point tunnel, towards the application server 175 or the PDN 170 associated with the application server 175.

Subsequently, the CSN 105 may respond by sending an Attach Accept message to WCD 110 without any session management message but may include an indication (e.g., a "CIoT-attach" or the same indication as in the initial Attach Request message from the WCD 110) to confirm that PDN connection based on default parameters was established. In some other embodiment, the successful Attach may be an implicit confirmation that a default PDN connection using default parameters in the CSN was established. In some embodiments, the established default PDN connection is of a PDN type "IP" or PDN type "Non-IP."

Figure 3B:
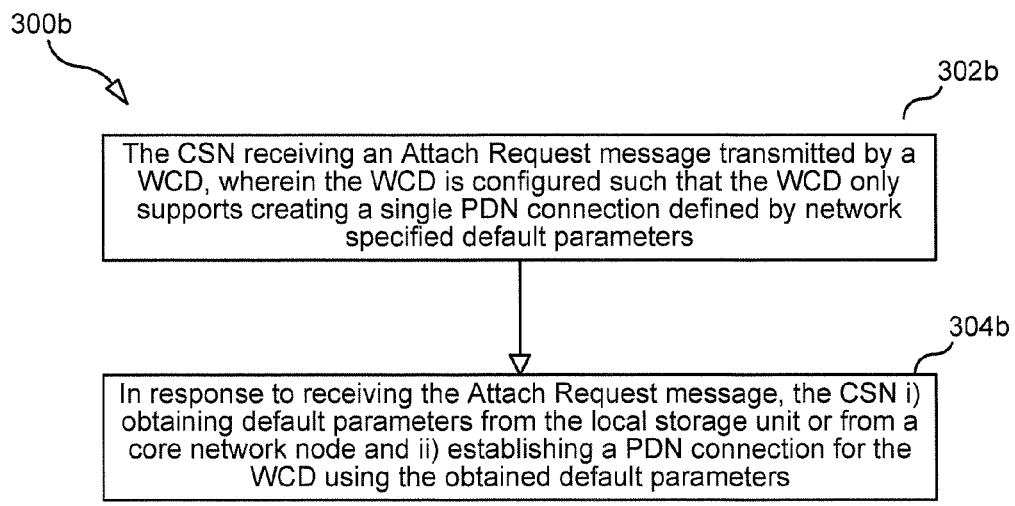
FIG. 3B is a flow chart illustrating a process performed by a core serving node, according to some embodiments.

FIG. 3B is a flow chart illustrating a process, according to some embodiments, that is performed by CSN 105.

In step 302b, the CSN 105 receives an Attach Request message transmitted by a WCD 110, wherein the WCD 110 is configured such that the WCD only supports creating a single PDN connection defined by network specified default parameters. For example, in some embodiments, the WCD 110 may be a CIoT device that only supports creating a single PDN connection. The single PDN connection (e.g., the default bearer) may be defined by network specified default parameters. For example, the Attach Request message of step 302b may be the Attach Request message as described above in connection with step 302a of FIG. 3A and step 202 of FIG. 2. In some embodiment, the single PDN connection created is also a single QoS/QCI PDN connection. Hence the CSN 105 may mark the PDN connection, e.g. in its context information, as single QoS or single QCI and refrain from creating any dedicated bearers for the PDN connection.

In step 304b, in response to receiving the Attach Request message, the CSN 105 i) obtains default parameters from its local storage unit or from a core network 150 node and ii) establishes a PDN connection for the WCD using the obtained default parameters. These functions may be performed by the CSN 105 in a similar manner as described above in connection with step 302a of FIG. 3A.

Figure 4A:
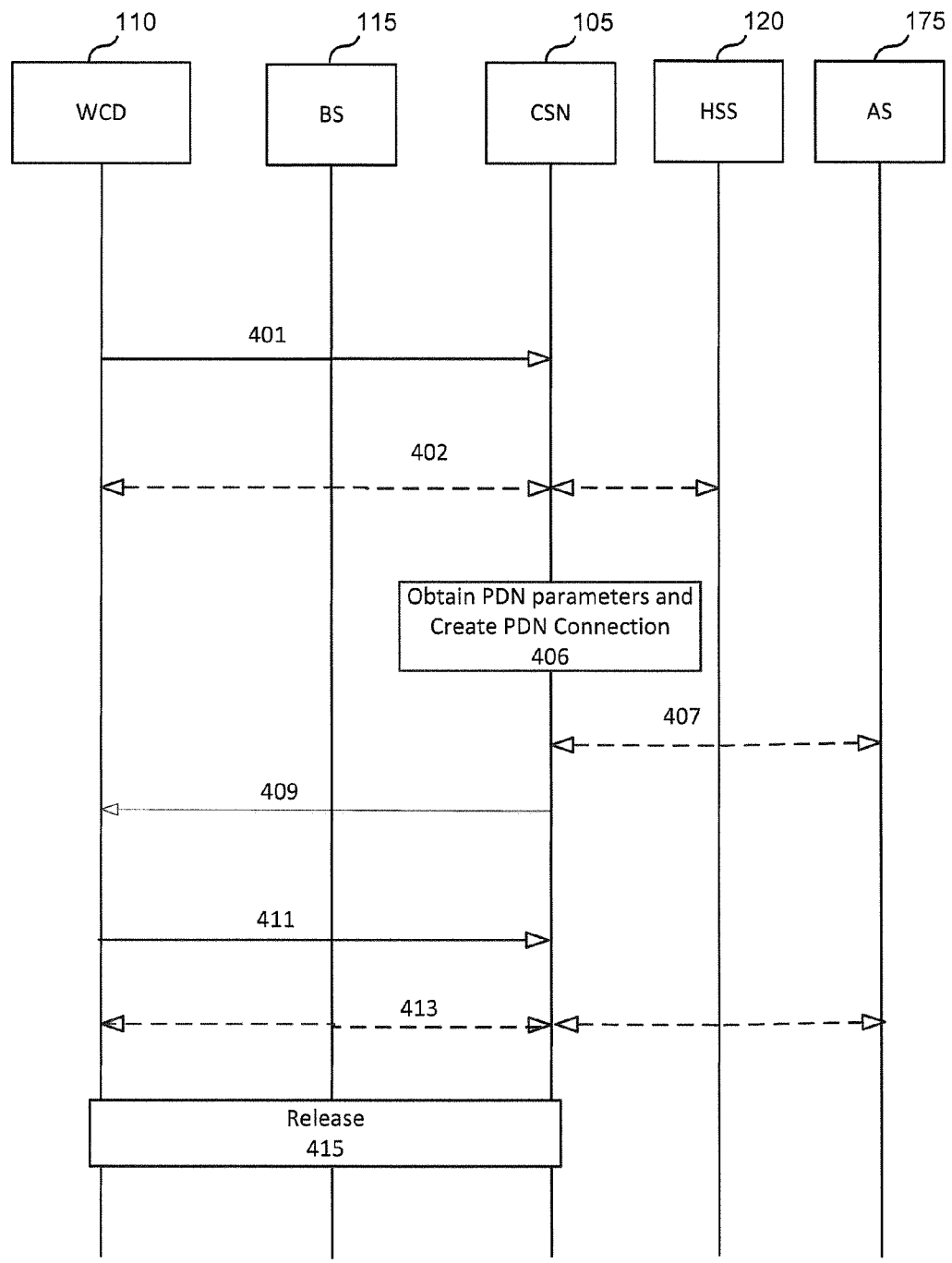
FIG. 4A is a signaling diagram, according to some embodiments.

FIG. 4A is a signaling diagram according to some embodiments. FIG. 4A depicts messages transmitted between WCD 110, BS 115, CSN 105, HSS 120, and Application Server 175. The signaling largely follows the TS 23.401 "E-UTRAN Initial Attach" clause 5.3.2.1, with differences as described and with some inter-node signaling collapsed into intra-node handling depending on what the CSN 105 consists of as is described herein.

The signaling indicated as 401 comprises the initial CIoT-Attach Request message transmitted from the WCD 110 to the CSN 105 via BS 115. The initial CIoT-attach message 401 may comprise, for example, an Attach Request message described above in connection with steps 202 and 302 of FIGS. 2 and 3, which Attach Request message includes information indicating that the CSN 105 should establish a single PDN connection for the WCD 110 using default parameters obtained by the CSN 105 from its local storage unit or from a core network node. For example, the initial CIoT-attach message 401 may be an message (e.g., Attach Request) having an EPS attach type IE, wherein the EPS attach type IE contains a value (e.g., "CIoT-attach") indicating that the CSN should establish the PDN connection for the WCD 110 using default parameters obtained by the CSN 105 from its local storage unit or from a core network node. In some embodiment, the created PDN connection is a PDN connection with a single QoS/QCI property, i.e. the network should refrain from creating any dedicated bearers for the PDN connection.

The signaling indicated as 402 between the WCD 110 and the CSN 105 (via BS 115) and the CSN 105 and HSS 120 comprises an authentication procedure. In some embodiments, the authentication procedure may be necessary to enable the WCD 110 to attach to the core network 150 and accordingly permit the CSN 105 to establish a PDN connection on behalf of the WCD 110. As described above, the HSS 120 in core network 150 may comprise a database that contains user-related and subscriber-related information that provides support for user authentication and access authorization.

The signaling indicated as 406 at the CSN 105 includes the CSN 105 obtaining PDN parameters and the establishment of a PDN connection using the obtained parameters. As described above, in response to receiving the Attach Request message (401) from WCD 110, the CSN 105 may obtain default PDN connection parameters from its local storage or from another node in CN 150, such as HSS 120. The CSN 105 may then initiate a procedure to establish a default bearer by, for example, generating and providing a Create Session Request message that includes some or all of the obtained default PDN connection parameters. As described above, in embodiments where the CSN 105 comprises a MME, SGW, and PGW, the MME may provide a Create Session Request message comprising one or more of the obtained default PDN connectivity parameters to the PGW via a S11 interface. In some embodiment, the created PDN connection is a PDN connection with a single QoS/QCI property, i.e. the network should refrain from creating any dedicated bearers for the PDN connection.

Figure 4B:
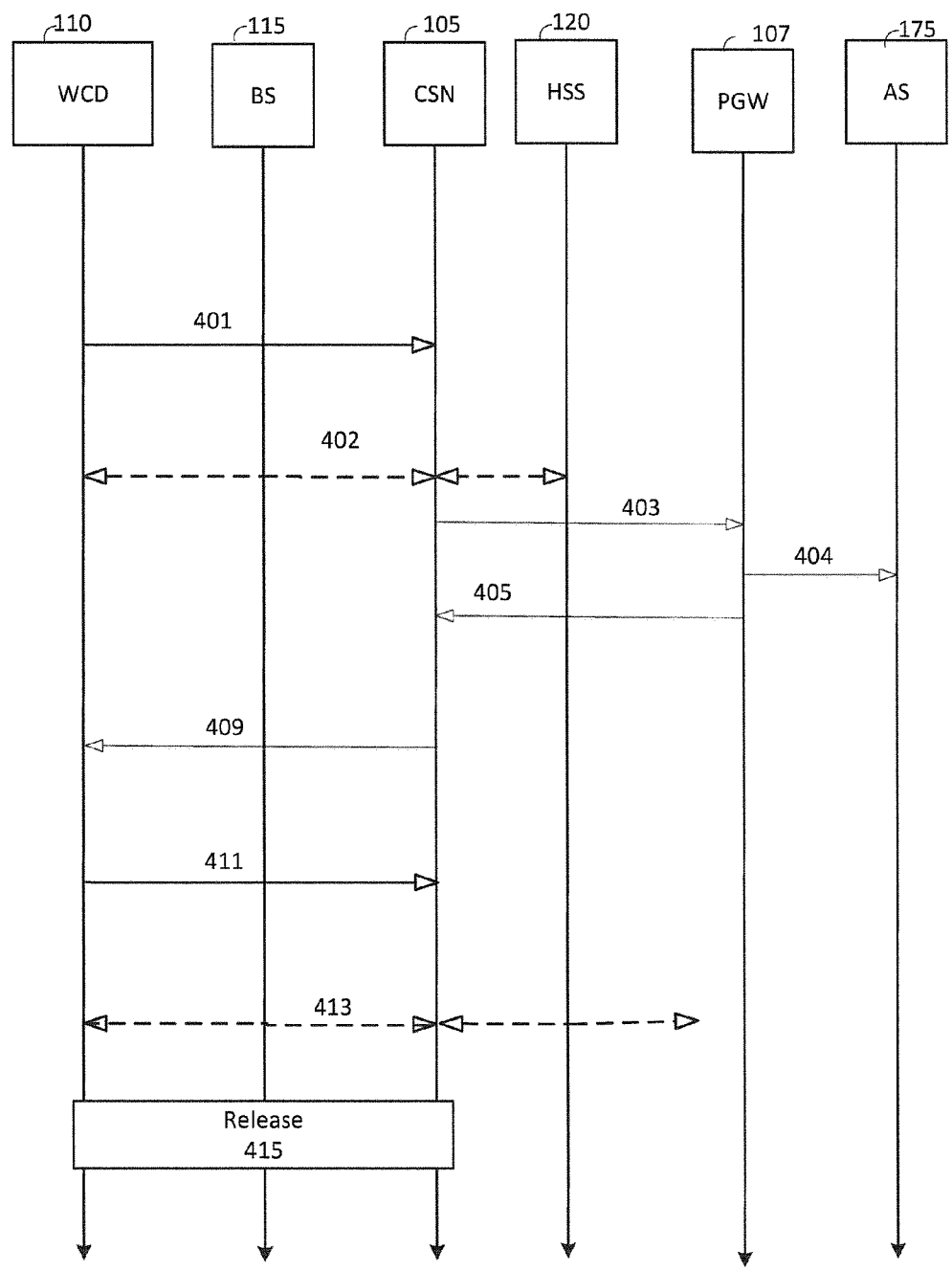
FIG. 4B is a signaling diagram, according to some embodiments.

Alternatively, in embodiments where the CSN 105 does not include a PGW, or in a roaming case where the CSN 105 must forward the request to a PGW, the CSN 105 may send a Create Session Request message (see FIG. 4B, signal 403) via a S5 or S8 interface to a PGW 107 (the Request may be sent via a SGW). The Create Session Request message 403 includes one or more of the obtained default PDN connectivity parameters. Furthermore, as described above, a new "CIoT PDN," "CIoT-attach," "CIoT," or "Single-PDN" indication or similar indication may be included in the Create Session Request message 403 sent to the PGW in order to ensure that the PGW is aware that, for example, the session creation is generated in the CSN 105 and not the WCD 110, and/or that the WCD 110 uses a single PDN connection only. The CIoT PDN indication (or the like), instructs the PGW that it shall not create any dedicated bearers for the PDN connection. In response to the Create Session Request message, the PGW may transmit a Create Session Response to CSN 105 (see message 405 in FIG. 4B). The PGW 107 may include a "CIoT PDN", "CIoT-attach," "CIoT,", "Single QoS", "Single QCI", "Single PDN," "Implicit PDN," "CN generated PDN," "Create-PDN" indication, or the like, in the Create Session Response 405 to indicate the PGW's support for the alternate procedure with a single PDN connection. For example, the alternative procedure may signify support from the PGW that no dedicated bearers or modification of the bearer for the WCD 110 should be initiated.

Referring back to FIG. 4A, in some embodiment, the signaling indicated as 407 between the CSN 105 and the application server 175 comprises the optional establishment of a direct forwarding path, or point-to-point tunnel, to the PDN 170 associated with application server 175.

The signaling indicated as 409 between the CSN 105 and the WCD 110 (via BS 115) comprises the transmission of an Attach Accept message from the CSN 105 to the WCD 110. In some embodiments, the Attach Accept message 409 does not contain a session management message (e.g., an EPS session management (ESM) message, such as the ACTIVATE DEFAULT EPS BEARER CONTEXT REQUEST message). In other embodiments, the Attach Accept message includes only a minimal ACTIVATE DEFAULT EPS BEARER CONTEXT REQUEST message. For example, in some embodiments a minimal ACTIVATE DEFAULT EPS BEARER CONTEXT REQUEST message does not comprise one or more of the following information elements: Protocol discriminator, EPS bearer identity, Procedure transaction identity, EPS Quality of Service (QoS), access point name (APN), and PDN address.

In either embodiment, the Attach Accept message may include an indication (e.g., a "CIoT-attach" or the same indication as in the initial Attach Request message from the WCD 110) to confirm that a PDN connection was established. For example, the EPS attach result 1E, may contain the a value (e.g., "CIoT-attach") for confirming the WCD that the PDN connection was created. Furthermore, in some embodiments, the Attach Accept message may comprise one or more information elements, such as Protocol discriminator, EPS bearer identity, Procedure transaction identity, EPS QoS, APN, and PDN address, that were included in the Activate Default EPS Bearer Context Request message.

The signaling indicated as 411 between the WCD 110 and the CSN 105 (via BS 115) comprises the transmission of an Attach Complete message from the WCD 110 to the CSN 105.

The signaling indicated as 413 between the WCD 110 and the CSN 105 (via BS 115) and the CSN 105 and the Application Server 175 comprises the transmission of user data between the WCD 110 and Application Server 175 using the established PDN connection.

The signaling indicated as 415 between the WCD 110 and the CSN 105 comprises the release of the S1 and the radio resource control channel.

Figure 5:
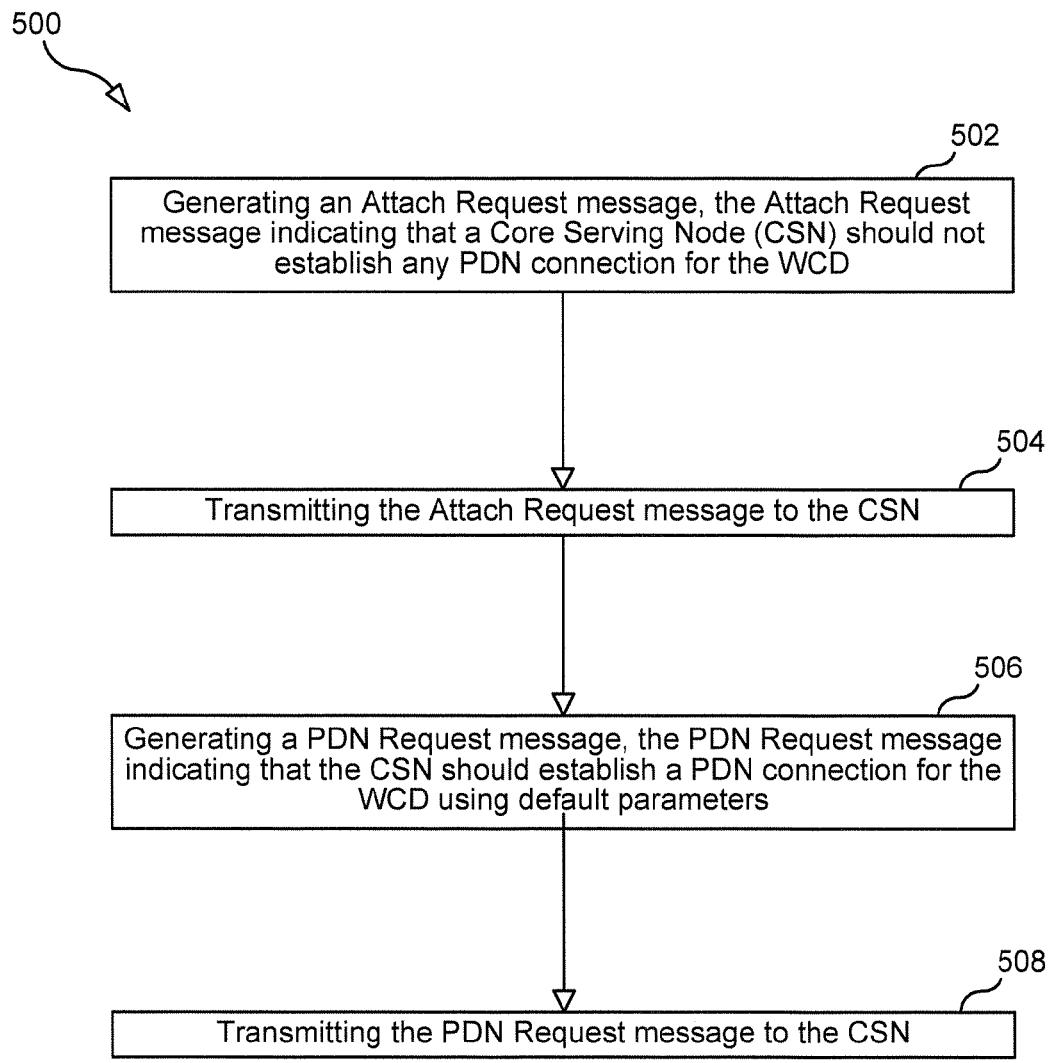
FIG. 5 is a flow chart illustrating a process performed by a wireless communication device, according to some embodiments.

FIG. 5 is a flow chart illustrating a process, according to some embodiments, that is performed by WCD 110. This is an alternative to creating the PDN connection as part of the attach procedure as have been illustrated in previous figures. For some very low end CIoT devices that does not use any PDN connection for very long periods of time, e.g. usually only sends SMS, it may be useful to be able to create a default PDN connection only when needed. That is, not as part of the attach procedure, but as a separate procedure that can be performed at a later stage. FIGS. 5, 6, 7A and 7B describes that specific case.

In step 502, the WCD 110 generates an Attach Request message, the Attach Request message indicating that the CSN 105 should not establish any PDN connection for the WCD 110. In some embodiments (see e.g. TR 23.720 v0.1.0 clause 6.11), the Attach Request message comprises and indication to only register to the network but not establish any PDN connection. For example, the Attach Request message may include an "EMM context only" indication or a "No PDN connection required" indication in order to indicate that the WCD 110 wants to attach to core network 150 without immediately establishing a PDN connection. Thus, in some embodiments, the WCD 110 may attach or become attached to a core network 150 without any PDN connection. Accordingly, after the Attach procedure is completed, the WCD 110 may engage in Short Message Service (SMS) procedures.

In step 504, the WCD 110 transmits the Attach Request message described above to the CSN 105.

In step 506, which is performed after some time e.g. when a certain communication need occurs that cannot be met by SMS services, the WCD 110 generates a PDN Request message, the PDN Request message indicating that the CSN 105 should establish a single PDN connection using default parameters. For example, after initially attaching to the network 150, the WCD 110 may subsequently wish to establish a PDN connection because the WCD 110 has data that it needs to transmit (e.g., user data that it needs to transmit to an application server). In some embodiments, the PDN request is a new NAS message comprising a minimum set of parameters, or potentially none, that indicates to the CSN 105 that it should establish a CIoT PDN connection. In some embodiments, the PDN request is a NAS message comprising a flag (e.g., a one bit indicator) indicating that the CSN 105 should establish a CIoT PDN connection. In some embodiments, the PDN request does not include a PDN type. In some embodiments, the PDN request is a Default Connectivity Request message that only contains a minimum set of parameters, or none, that indicates to the CSN 105 that it should establish a default or CIoT PDN connection using default parameters in the CSN 105.

In step 508, the WCD 110 transmits the PDN Request message to the CSN 105.

In response to receiving the PDN request from the WCD 110, the CSN 105 may establish a PDN connection using default parameters, e.g., default parameters from its local storage unit or from another node in the core network 150, as explained above in connection with FIGS. 3A, 3B, and 4A, 4B.

Figure 6:
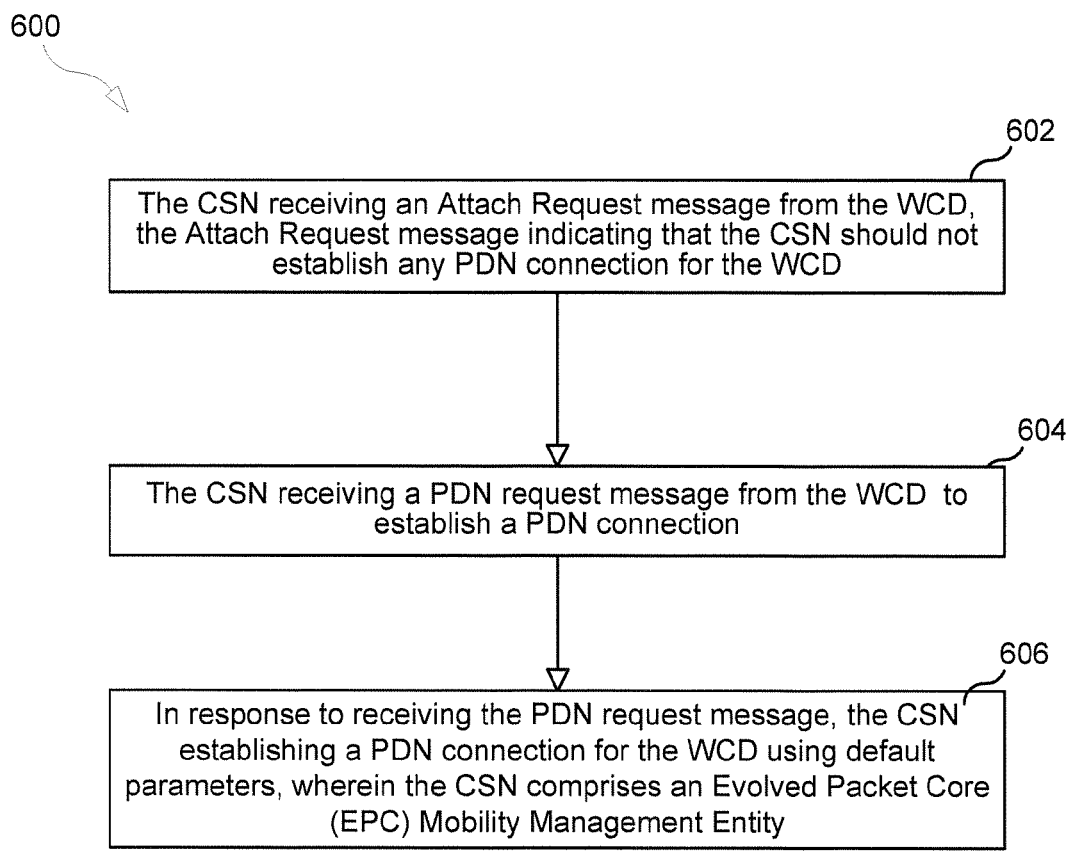
FIG. 6 is a flow chart illustrating a process performed by a core network node, according to some embodiments.

FIG. 6 is a flow chart illustrating a process, according to some embodiments, that is performed by CSN 105.

At step 602, the CSN 105 receives an Attach Request message from the WCD 110, the Attach Request message indicating that the CSN 105 should not establish any PDN connection for the WCD 110. The Attach Request message may be the same as described above in connection with step 502 of FIG. 5.

At step 604, the CSN 105 receives a PDN request from the WCD 110 to establish a single PDN connection. The PDN request message may be the same as described above in connection with step 504 of FIG. 5. In some embodiment, the PDN request may be a single PDN connection (e.g. default PDN connection) with a single QoS/QCI property, i.e. the network should refrain from creating any dedicated bearers for the PDN connection.

At step 606, the CSN 105, in response to receiving the PDN request message, the CSN 105 establishes a PDN connection for the WCD 110 using default parameters. The establishment of the PDN connection for the WCD 110 using default parameters may be the same as described above in connection with step 304 of FIG. 3 and step 406 of FIG. 4.

Figure 7A:
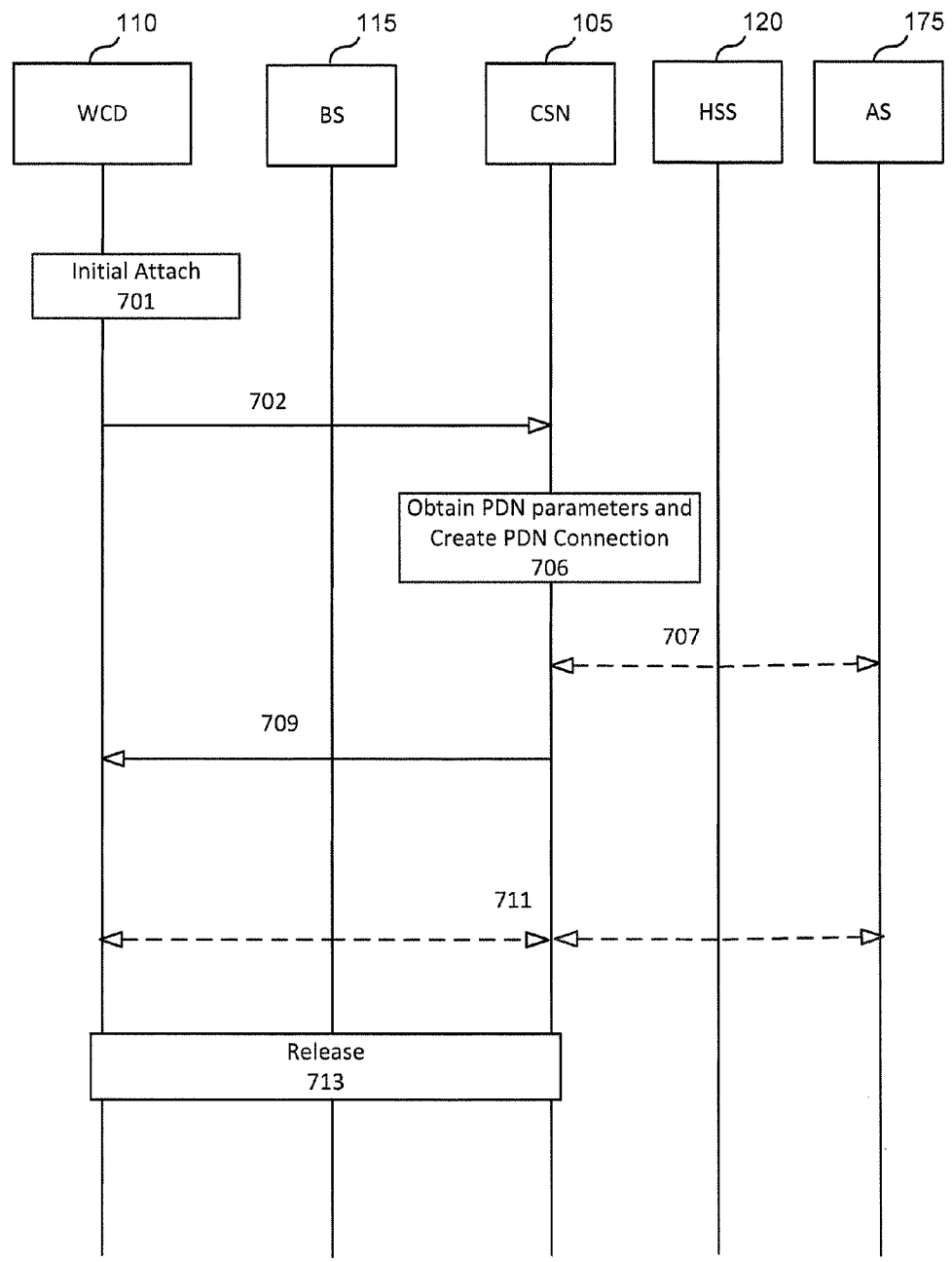
FIG. 7A is a signaling diagram, according to some embodiments.
Figure 7B:
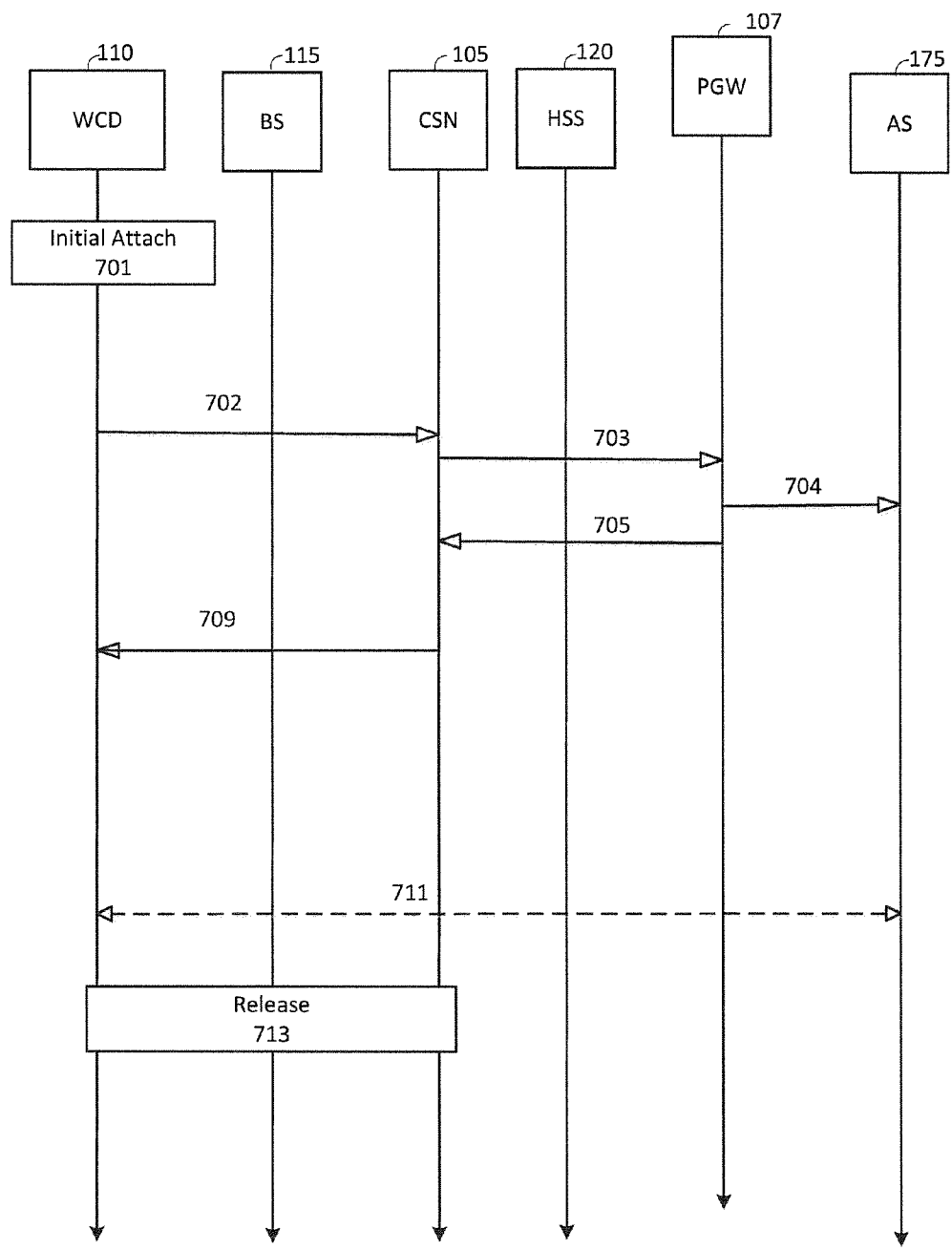
FIG. 7B is a signaling diagram, according to some embodiments.

FIG. 7A is a signaling diagram, according to some embodiments. FIG. 7A depicts messages transmitted between a WCD 110, BS 115, CSN 105, HSS 120, and Application Server 175.

The signaling indicated as 701 comprises the initial Attach Request message transmitted from the WCD 110 indicating that the CSN 105 should not establish any PDN connection for the WCD 110. For example, the Attach Request message may be made in accordance with the Attach with EMM context only procedure as is described in 3GPP TR 23.720 v0.1.0, clause 6.11. In particular, the WCD 110 may send an Attach Request message with an indicator "No PDN connection required" in order to indicate that the WCD 110 wants to attach to core network 150 without immediately establishing a PDN connection.

The signaling indicated as 702 comprises the WCD 110 transmitting a NAS message to the CSN 105 (via the BS 115) indicating that a default PDN connection shall be established. For example, after initially attaching to the network 150, the WCD 110 may subsequently wish to establish a PDN connection. In some embodiments, the PDN request is a new NAS message comprising a minimum set of parameters, or potentially none, that indicates to the CSN 105 that it should establish a CIoT PDN connection. In some embodiments, the PDN request is a NAS message comprising a flag indicating that the CSN 105 should establish a CIoT PDN connection. In some embodiments, the PDN request does not include a PDN type. In some embodiments, the PDN request is a Default Connectivity Request message that only contains a minimum set of parameters, or none, that indicates to the CSN 105 that it should establish a default or CIoT PDN connection for the WCD 110.

The signaling indicated as 706 includes the CSN 105 obtaining PDN parameters and the establishment of a PDN connection using the obtained parameters. In response to receiving the NAS message 702 (e.g., "PDN request"), the CSN 105 may obtain default PDN connection parameters from its local storage or from another node in CN 150, such as HSS 120. The CSN 105 may then initiate a procedure to establish a default bearer by, for example, generating and providing a Create Session Request message that includes some or all of the obtained default PDN connection parameters. As described above, in embodiments where the CSN 105 comprises a MME, SGW, and PGW, the MME may provide a Create Session Request message comprising one or more of the obtained default PDN connectivity parameters to the PGW via a S11 interface.

Alternatively, in embodiments where the CSN 105 does not include a PGW, or in a roaming case where the CSN 105 must forward the request to a PGW, the CSN 105 may send a Create Session Request message (see FIG. 7B, signal 703) via a S5 or S8 interface to a PGW 107 (the Request may be sent via a SGW). The Create Session Request message 703 may be identical to message 403 described above and the PGW responds to message 703 in the same way that it responds to message 403. In response to the Create Session Request message 703, the PGW may transmit to CSN 105 a Create Session Response (see message 705 in FIG. 7B). Message 705 may be identical to message 405. In some embodiment, the CSN 105 or the PGW 107 may in response to the Create Session Request message 703 establish a direct forwarding path, e.g., a point-to-point tunnel, towards the application server 175 or the PDN 170 associated with the application server 175 (see signaling 707 in FIG. 7A and 704 in FIG. 7B).

As described above, in some embodiments, the PGW may include a "CIoT PDN", "CIoT-attach," "CIoT," "Single PDN," "Implicit PDN," "CN generated PDN," "Create-PDN" indication, or the like, in the Create Session Response to indicate the PGW's support for the alternate procedure with a single PDN connection. For example, the alternative procedure may signify support from the PGW that no dedicated bearers or modification of the bearer for the WCD 110 should be initiated.

The signaling indicated as 709 between the CSN 105 and the WCD 110 comprises a message indicating that a default PDN connection has been established. In some embodiments, the message may comprise a Create Session Response message containing a minimum set of parameters, e.g., a result of the PDN request.

The signaling indicated as 711 between the WCD 110 and the CSN 105 (via BS 115) and the CSN 105 and the Application Server 175 comprises the transmission of user data between the WCD 110 and Application Server 175 using the established PDN connection.

The signaling indicated as 713 between the WCD 110 and the CSN 105 comprises the release of the S1 and the radio resource control channel. In some embodiments, the PDN connection remains established until the WCD 110 detaches from the network. In other embodiments, the PDN connection may be released or deactivated when it is no longer needed. For example, the WCD 110 may initiate appropriate NAS signaling analogous with how the PDN connection was created (e.g., with a minimum set of parameters) to release the connection. Alternatively, the release of the PDN connection may be initiated by the CSN 105 analogous to how dedicated bearers are handled, e.g., using a Deactivate EPS Bearer Context Request message with a Deactivate EPS Bearer Context Accept message. In some embodiments, the deactivation may be implicit. For example, there may be timers in the WCD 110 and/or CSN 105 that indicate how long the PDN connection has been inactive, and if the time has exceeded a predetermined threshold, the PDN connection may be released. One advantage with using an implicit deactivation is that no signaling may be required to release or deactivate the PDN connection. However, the WCD 110 may remain attached to the core network 150 after the PDN connection has been released.

A person of skill in the art should appreciate that, by having the CSN 105 handle the EPS Session Management on behalf of a WCD 110 as described above, several NAS messages operating on the default PDN connection may be removed from the protocol stack of the WCD 110 and instead may be handled by the CSN 105 on behalf of the WCD 110. This provides a technological improvement to WCDs 110 and the signaling protocol with the CSN 105 because of the reduction in complexity, power consumption, memory and CPU resource usage (NAS stack footprint) of the WCDs 110 and reduction of radio resource usage which benefits both the WCDs 110 and the network of the operator.

The table below lists messages that may be removed from the WCD NAS protocol stack (i.e. which are not needed) in accordance with some embodiments:

| Procedures | Messages ESM procedures | Not Needed |
|---|---|---|
| Network initiated ESM procedures | Activate default EPS bearer context request | X |
| | Activate default EPS bearer context accept | X |
| | Activate default EPS bearer context reject | X |
| | Activate dedicated EPS bearer context request | X |
| | Activate dedicated EPS bearer context accept | X |
| | Activate dedicated EPS bearer context reject | X |
| | Modify EPS Bearer context request | X |
| | Modify EPS Bearer context accept | X |
| | Modify EPS Bearer context reject | X |
| | Deactivate EPS bearer context request | X |
| | Deactivate EPS bearer context accept | X |
| UE requested ESM procedures | PDN connectivity request | X |
| | PDN connectivity reject | X |
| | PDN disconnect request | X |
| | PDN disconnect reject | X |
| | Bearer resource allocation request | X |
| | Bearer resource allocation reject | X |
| | Bearer resource modification request | X |
| | Bearer resource modification reject | X |
| | ESM information request | X |
| | ESM information response | X |
| Miscellaneous procedures | Notification | X |

Figure 8A:
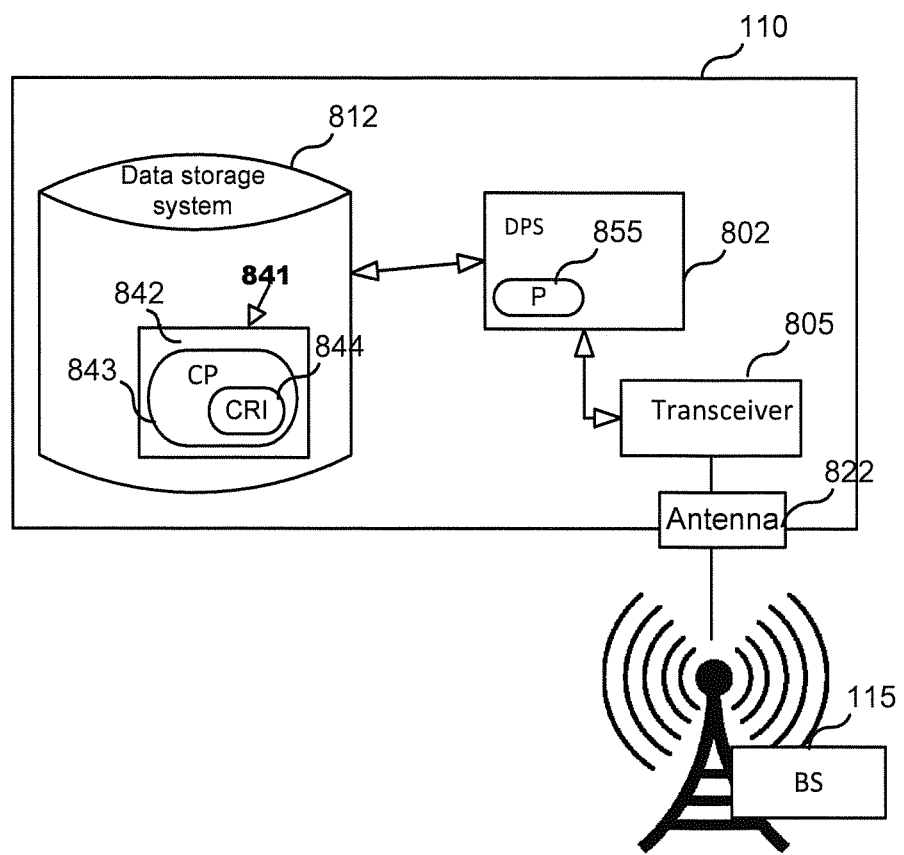
FIG. 8A is a block diagram of a WCD according to some embodiments.

FIG. 8A is a block diagram of an embodiment of WCD 110. As shown in FIG. 8A, WCD 110 may include: a data processing system (DPS) 802, which may include one or more processors 855 (e.g., a general purpose microprocessor and/or one or more other data processing circuits, such as an application specific integrated circuit (ASIC), field-programmable gate arrays (FPGAs), and the like); a transceiver 805 coupled to an antenna 822 for use wirelessly transmitting data; and a data storage system 812, which may include one or more non-volatile storage devices and/or one or more volatile storage devices (e.g., random access memory (RAM)). In embodiments where WCD 110 includes a general purpose microprocessor, a computer program product (CPP) 841 may be provided. CPP 841 includes a computer readable medium (CRM) 842 storing a computer program (CP) 843 comprising computer readable instructions (CRI) 844. CRM 842 may be a non-transitory computer readable medium, such as, but not limited to, magnetic media (e.g., a hard disk), optical media (e.g., a DVD), memory devices (e.g., random access memory), and the like. In some embodiments, the CRI 844 of computer program 843 is configured such that when executed by data processing system 802, the CRI causes the WCD 110 to perform steps described above (e.g., steps described above with reference to the flow charts). In other embodiments, WCD 110 may be configured to perform steps described herein without the need for code. That is, for example, data processing system 802 may consist merely of one or more ASICs. Hence, the features of the embodiments described herein may be implemented in hardware and/or software.

Figure 8B:
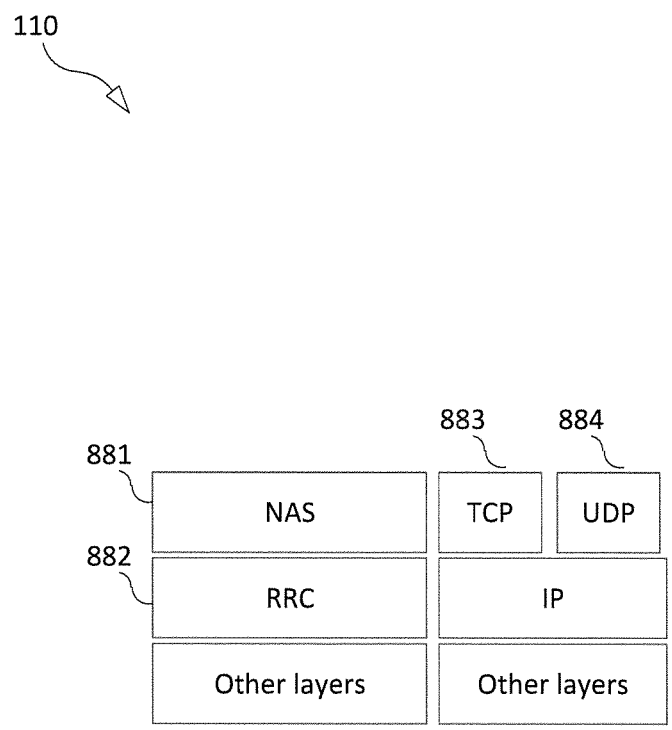
FIG. 8B is a protocol block diagram of a WCD according to some embodiments.

Referring now to FIG. 8B, FIG. 8B illustrates some protocol layers that may be executed by DPS 802 according to some embodiments. As shown in FIG. 8B, WCD 110 may include a set of control plane protocol layers (NAS layer 881, RRC layer 882) and a set of user plane protocol layers (e.g, TCP layer 883, UDP 884). These layers 881-884 may logically sit on top of other layers (e.g., L2/L1, IP). The NAS layer 881 is for processing and generating NAS messages. For example, the NAS layer may be configured to generate the Attach Request message and PDN Request messages described above.

In some embodiments (e.g., embodiments in which WCD 110 is a CIoT device), the NAS layer 881 i) only supports creating one Packet Data Network (PDN) connection and/or ii) only supports creating a PDN connection defined by a network specified quality of service (QoS), a network specified access point name (APN), and/or a network specified Internet Protocol (IP) address.

Figure 9:
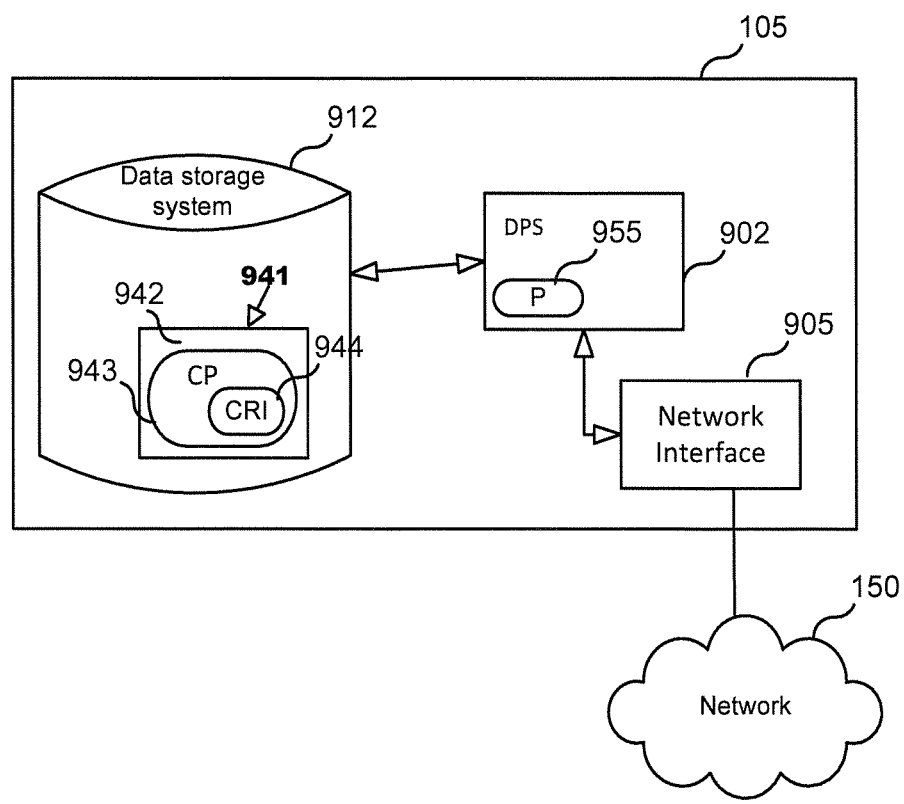
FIG. 9 is a block diagram of a core serving node apparatus, according to some embodiments.

FIG. 9 is a block diagram of an embodiment of CSN 105. As shown in FIG. 9, CSN 105 may include: a data processing system (DPS) 902, which may include one or more processors 955 (e.g., a general purpose microprocessor and/or one or more other data processing circuits, such as an application specific integrated circuit (ASIC), field-programmable gate arrays (FPGAs), and the like); a network interface 905 for use in connecting CSN 105 to a network; and local storage unit (a.k.a., "data storage system") 912, which may include one or more non-volatile storage devices and/or one or more volatile storage devices (e.g., random access memory (RAM)). In embodiments where CSN 105 includes a general purpose microprocessor, a computer program product (CPP) 941 may be provided. CPP 941 includes a computer readable medium (CRM) 942 storing a computer program (CP) 943 comprising computer readable instructions (CRI) 944. CRM 942 may be a non-transitory computer readable medium, such as, but not limited to, magnetic media (e.g., a hard disk), optical media (e.g., a DVD), memory devices (e.g., random access memory), and the like. In some embodiments, the CRI 944 of computer program 943 is configured such that when executed by data processing system 902, the CRI causes the CSN 105 to perform steps described above (e.g., steps described above with reference to the flow charts). In other embodiments, CSN 105 may be configured to perform steps described herein without the need for code. That is, for example, data processing system 902 may consist merely of one or more ASICs. Hence, the features of the embodiments described herein may be implemented in hardware and/or software.

Some embodiments described above may be summarized in the following manner:

In one aspect, there is provided a method performed by a wireless communication device (WCD) (e.g., a cellular Internet-of-Things (CIoT) device) for requesting a packet data network (PDN) connection. In some embodiments, the method includes generating a control message to be sent to a core serving node (CSN), wherein the control message includes information indicating that the CSN should establish only a single PDN connection (e.g., a CIoT PDN connection) for the WCD using default parameters obtained by the CSN from a local storage unit or from a core network node. The method also includes transmitting the control message to the CSN. In some embodiments, the control message is a Non-Access Stratum (NAS) message. In some embodiments, the NAS message is an Attach Request message. In some embodiments, the Attach Request message does not include an Evolved Packet System (EPS) Session Management (ESM) Message Container. In some embodiments, the Attach Request message comprises an Evolved Packet System (EPS) Session Management (ESM) Message Container having no content. In some embodiments, the Attach Request message does not include a PDN Connectivity Request message. In some embodiments, the control message does not specify a PDN type. In some embodiments, the control message comprises an EPS attach type information element, and the information indicating that the CSN should establish a single PDN connection consists of an EPS attach type value contained within the EPS attach type information element. In some embodiments, the information indicating that the CSN should establish said PDN connection for the WCD consists of a flag.

In some embodiments, the method further includes the WCD transmitting to the CSN an Attach Request message indicating that a the CSN should not establish any PDN connection for the WCD. In such embodiments, the method may further include the WCD transmitting to the CSN a PDN request message after transmitting the Attach Request message to the CSN, wherein the PDN request message indicates that the CSN should establish only a single PDN connection for the WCD using default parameters. In some embodiments, the step of transmitting the PDN request message is performed as a result of the WCD obtaining user data that needs to be sent to a server connected to the PDN.

In another aspect, a WCD is provided, wherein the WCD includes a transmitter; and a data processing system for executing a non-access stratum (NAS) protocol layer for processing and generating NAS messages. The NAS protocol layer is configured to generate a control message to be sent to a core serving node (CSN), wherein the control message includes information indicating that the CSN should establish only a single PDN connection for the WCD using default parameters obtained by the CSN from a local storage unit or from a core network node. The data processing system is configured to employ the transmitter to transmit the control message to the CSN. In some embodiments, the control message is a Non-Access Stratum (NAS) message. In some embodiments, the NAS message is an Attach Request message. In some embodiments, the Attach Request message does not include an Evolved Packet System (EPS) Session Management (ESM) Message Container. In some embodiments, the Attach Request message comprises an Evolved Packet System (EPS) Session Management (ESM) Message Container having no content. In some embodiments, the Attach Request message does not include a PDN Connectivity Request message. In some embodiments, the control message does not specify a PDN type. In some embodiments, the control message comprises an EPS attach type information element, and the information indicating that the CSN should establish a single PDN connection consists of an EPS attach type value contained within the EPS attach type information element.

In some embodiments, the NAS layer is further configured to generate an Attach Request message indicating that the CSN should not establish any packet data network (PDN) connection for the WCD. The data processing system is configured to employ the transmitter to transmit the Attach Request message to the CSN. The NAS layer is further configured to generate a PDN Request message indicating that the CSN should establish a single PDN connection for the WCD using default parameters. The data processing system is further configured to employ the transmitter to transmit the PDN Request message to the core serving node (CSN).

In another aspect there is provided a method performed by the CSN (e.g., one or more of a Mobility Management Entity (MME), a Serving Gateway (SGW), and a PDN Gateway (PGW)), which includes a local storage unit, for establishing a packet data network (PDN) connection for the WCD (a cellular Internet-of-Things (CIoT) device). In some embodiments, the method includes the CSN receiving a control message transmitted by the WCD, wherein the control message includes information indicating that the CSN should establish only a single PDN connection (e.g., a CIoT PDN connection) for the WCD using default parameters obtained by the CSN from the local storage unit or from a core network node. The method also includes, in response to the receiving the control message, the CSN obtaining: i) default parameters from the local storage unit or from a core network node and ii) establishing a single PDN connection for the WCD using the obtained default parameters. In some embodiments, the control message is a Non-Access Stratum (NAS) message. In some embodiments, the NAS message is an Attach Request message. In some embodiments, the Attach Request message does not include an Evolved Packet System (EPS) Session Management (ESM) Message Container. In some embodiments, the Attach Request message comprises an Evolved Packet System (EPS) Session Management (ESM) Message Container having no content. In some embodiments, the Attach Request message does not include a PDN Connectivity Request message. In some embodiments, the control message does not specify a PDN type. In some embodiments, the control message comprises an EPS attach type information element, and the information indicating that the CSN should establish a single PDN connection consists of an EPS attach type value contained within the EPS attach type information element.

In some embodiments, the method also includes the CSN sending a Create Session Request message to a PDN Gateway (PGW), the Create Session Request message comprising one or more of the obtained default parameters; and the CSN receiving a Create Session Response message from the PGW. In some embodiments, the Create Session Request message comprises information indicating that there is only one PDN connection for the WCD. In some embodiments, the Create Session Request message comprises information that the PGW should not establish Dedicated Bearers for the established PDN connection.

In some embodiments, the method also includes the CSN transmitting to the WCD an Attach Accept message as a result of accepting the Attach Request, wherein the Attach Accept message transmitted by the CSN to the WCD comprises an ESM message container which includes an Activate Default EPS Bearer Context Request message, and said Activate Default EPS Bearer Context Request message does not include one or more of the following information elements: Protocol discriminator, EPS bearer identity, Procedure transaction identity, EPS Quality of Service (QoS), access point name (APN), and PDN address. In other embodiments, the method also includes the CSN transmitting to the WCD an Attach Accept message as a result of accepting the Attach Request, wherein the Attach Accept message transmitted by the CSN to the WCD comprises an information element comprising one or more of: a protocol discriminator, an EPS bearer identity, a procedure transaction identity, an EPS Quality of Service (QoS) value, an access point name (APN), and a PDN address, wherein the information element is not an ESM message container information element. In some embodiments, the WCD refrains from sending to the CSN an Attach Complete message.

In some embodiments, the method further includes the CSN receiving an Attach Complete message transmitted by the WCD as a result of the WCD activating a default EPS bearer context, wherein the Attach Complete message transmitted by the WCD does not comprise an Activate Default EPS Bearer Context Accept message.

In some embodiments, the method further includes the CSN receiving an Attach Request message transmitted by the WCD, the Attach Request message indicating that the CSN should not establish any PDN connection for the WCD; after receiving the Attach Request message, the CSN receiving a PDN Request from the WCD to establish a single CIoT PDN connection; and in response to the receiving the PDN Request, the CSN establishing a CIoT PDN connection for the WCD using default parameters. In some embodiments, the CSN is an Evolved Packet Core (EPC) Mobility Management Entity (MME).

In another aspect a CSN is provided, wherein the CSN includes a data processing system; a network interface electronically coupled to the data processing system; and a local storage unit. In some embodiments, the data processing system is configured such that, in response to the CSN receiving a control message transmitted by a wireless communication device (WCD) including information indicating that the CSN should establish only a single PDN connection for the WCD using default parameters obtained by the CSN from the local storage unit or from a core network node, the data processing system: i) obtains the default parameters from the local storage unit or from a core network node, and ii) establishes a single PDN connection for the WCD using the obtained default parameters. In some embodiments, the control message is a Non-Access Stratum (NAS) message. In some embodiments, the NAS message is an Attach Request message. In some embodiments, the Attach Request message does not include an Evolved Packet System (EPS) Session Management (ESM) Message Container. In some embodiments, the Attach Request message comprises an Evolved Packet System (EPS) Session Management (ESM) Message Container having no content. In some embodiments, the Attach Request message does not include a PDN Connectivity Request message. In some embodiments, the control message does not specify a PDN type. In some embodiments, the control message comprises an EPS attach type information element, and the information indicating that the CSN should establish a single PDN connection consists of an EPS attach type value contained within the EPS attach type information element.

In some embodiments, the data processing system is further configured such that, in response to the CSN receiving from the WCD an Attach Request message indicating that the CSN should not establish any PDN connection for the WCD, the data processing refrains from establishing a PDN connection in response to the Attach Request message. In such embodiments, the data processing system is further configured such that, in response to the CSN receiving from the WCD a PDN Request message, the data processing system establishes a single CIoT PDN connection for the WCD using default parameters.

While various embodiments have been described above, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method performed by a wireless communication device (WCD) for requesting a packet data network (PDN) connection, the method comprising:
   generating a control message to be sent to a core serving node (CSN), wherein the control message includes information indicating that the CSN should establish only a single PDN connection for the WCD using default parameters obtained by the CSN from a local storage unit or from a core network node; and
   transmitting the control message to the CSN,
   wherein the control message is a Non-Access Stratum (NAS) Attach Request message, and
   wherein the Attach Request message does not include an Evolved Packet System (EPS) Session Management (ESM) Message Container, the Attach Request message comprises an ESM Message Container having no content or the Attach Request message does not include a PDN Connectivity Request message.

2. The method of claim 1, wherein the control message does not specify a PDN type.

3. The method of claim 1, wherein
   the control message comprises an EPS attach type information element, and
   the information indicating that the CSN should establish a single PDN connection consists of an EPS attach type value contained within the EPS attach type information element.

4. The method of claim 1, wherein the information indicating that the CSN should establish said PDN connection for the WCD consists of a flag.

5. The method of claim 1, wherein the WCD is a cellular Internet-of-Things (CIoT) device.

6. The method of claim 1, further comprising:
   transmitting to the CSN an Attach Request message indicating that the CSN should not establish any PDN connection for the WCD;
   after transmitting the Attach Request message to the CSN, transmitting to the CSN a PDN request message indicating that the CSN should establish a single PDN connection for the WCD using default parameters.

7. The method of claim 6, wherein the step of transmitting the PDN request message is performed as a result of the WCD obtaining user data that needs to be sent to a server connected to the PDN.

8. A wireless communication device (WCD), comprising:
a transmitter; and
a data processing system for executing a non-access stratum (NAS) protocol layer for processing and generating NAS messages, wherein
the NAS protocol layer is configured to generate a control message to be sent to a core serving node (CSN), wherein the control message includes information indicating that the CSN should establish only a single PDN connection for the WCD using default parameters obtained by the CSN from a local storage unit or from a core network node, and
the data processing system is configured to employ the transmitter to transmit the control message to the CSN, wherein the control message is a Non-Access Stratum (NAS) Attach Request message, and
wherein the Attach Request message does not include an Evolved Packet System (EPS) Session Management (ESM) Message Container, the Attach Request message comprises an ESM Message Container having no content or the Attach Request message does not include a PDN Connectivity Request message.

9. The WCD of claim 8, wherein the Attach Request message does not specify a PDN type.

10. The WCD of claim 8, wherein
the control message comprises an EPS attach type information element, and
the information indicating that the CSN should establish a single PDN connection consists of an EPS attach type value contained within the EPS attach type information element.

11. The WCD of claim 8, wherein the WCD is a cellular Internet-of-Things (CIoT) device.

12. The WCD of claim 8, wherein
the NAS layer is configured to generate an Attach Request message;
the data processing system is configured to employ the transmitter to transmit the Attach Request message to a core serving node (CSN), the Attach Request message indicating that the CSN should not establish any packet data network (PDN) connection for the WCD;
the NAS layer is further configured to generate a PDN Request message; and
the data processing system is further configured to employ the transmitter to transmit the PDN Request message to the core serving node (CSN), the PDN Request message indicating that the CSN should establish a single PDN connection for the WCD using default parameters.

13. A method performed by a core serving node (CSN) comprising a local storage unit for establishing a packet data network (PDN) connection for a wireless communication device (WCD), the method comprising:
the CSN receiving a control message transmitted by the WCD, wherein the control message includes information indicating that the CSN should establish only a single PDN connection for the WCD using default parameters obtained by the CSN from the local storage unit or from a core network node; and
in response to the receiving the control message, the CSN obtaining: i) default parameters from the local storage unit or from a core network node and ii) establishing a single PDN connection for the WCD using the obtained default parameters,
wherein the control message is a Non-Access Stratum (NAS) Attach Request message, and
wherein the Attach Request message does not include an Evolved Packet System (EPS) Session Management (ESM) Message Container, the Attach Request message comprises an ESM Message Container having no content or the Attach Request message does not include a PDN Connectivity Request message.

14. The method of claim 13, wherein the Attach Request message does not specify a PDN type.

15. The method of claim 13, wherein
the Attach Request message comprises an Evolved Packet System (EPS) attach type information element, and
the information indicating that the CSN should establish a single PDN connection consists of an EPS attach type value contained within the EPS attach type information element.

16. The method of claim 13, wherein the information indicating that the CSN should establish said PDN connection for the WCD consists of a flag.

17. The method of claim 13, further comprising:
the CSN sending a Create Session Request message to a PDN Gateway (PGW), the Create Session Request message comprising one or more of the obtained default parameters; and
the CSN receiving a Create Session Response message from the PGW.

18. The method of claim 17, wherein the Create Session Request message comprises information indicating that there is only one PDN connection for the WCD.

19. The method of claim 17, wherein the Create Session Request message comprises information that the PGW should not establish Dedicated Bearers for the established PDN connection.

20. The method of claim 13, wherein the CSN comprises one or more of a Mobility Management Entity (MME), a Serving Gateway (SGW), and a PDN Gateway (PGW).

21. The method of claim 13, further comprising: the CSN transmitting to the WCD an Attach Accept message as a result of accepting the Attach Request, wherein the Attach Accept message transmitted by the CSN to the WCD comprises an ESM message container which includes an Activate Default EPS Bearer Context Request message, and said Activate Default EPS Bearer Context Request message does not include one or more of the following information elements: Protocol discriminator, EPS bearer identity, Procedure transaction identity, EPS Quality of Service (QoS), access point name (APN), and PDN address.

22. The method of claim 13, further comprising
the CSN transmitting an Attach Accept message as a result of accepting the Attach Request, wherein the Attach Accept message transmitted by the CSN to the WCD comprises an information element comprising one or more of: a protocol discriminator, an EPS bearer identity, a procedure transaction identity, an EPS Quality of Service (QoS) value, an access point name (APN), and a PDN address, wherein the information element is not an ESM message container information element.

23. The method of claim 21, further comprising the WCD refraining from sending to the CSN an Attach Complete message.

24. The method of claim 21, further comprising the CSN receiving an Attach Complete message transmitted by the WCD as a result of the WCD activating a default EPS bearer context, wherein the Attach Complete message transmitted by the WCD does not comprise an Activate Default EPS Bearer Context Accept message.

25. The method of claim 13, wherein
the WCD is a cellular Internet-of-Things (CIoT) device, and
establishing the PDN connection for the WCD using the obtained default parameters further comprises establishing CIoT PDN connection.

26. The method of claim 13, further comprising:
the CSN receiving an Attach Request message transmitted by the WCD, the Attach Request message indicating that the CSN should not establish any PDN connection for the WCD;
after receiving the Attach Request message, the CSN receiving a PDN Request from the WCD to establish a single CIoT PDN connection; and
in response to the receiving the PDN Request, the CSN establishing a CIoT PDN connection for the WCD using default parameters.

27. The method of claim 26, wherein the CSN comprises an Evolved Packet Core (EPC) Mobility Management Entity (MME).

28. A core serving node (CSN), comprising:
a data processing system;
a network interface electronically coupled to the data processing system; and
a local storage unit, wherein
the data processing system is configured such that, in response to the CSN receiving a control message transmitted by a wireless communication device (WCD) including information indicating that the CSN should establish only a single PDN connection for the WCD using default parameters obtained by the CSN from the local storage unit or from a core network node, the data processing system:
 i) obtains the default parameters from the local storage unit or from a core network node, and
 ii) establishes a single PDN connection for the WCD using the obtained default parameters,
wherein the control message is a Non-Access Stratum (NAS) Attach Request message, and
wherein the Attach Request message does not include an Evolved Packet System (EPS) Session Management (ESM) Message Container, the Attach Request message comprises an ESM Message Container having no content or the Attach Request message does not include a PDN Connectivity Request message.

29. The CSN of claim 28, wherein the Attach Request message does not include a PDN Connectivity method message.

30. The CSN of claim 28, wherein the Attach Request message does not specify a PDN type.

31. The CSN of claim 28, wherein
the Attach Request message comprises an EPS attach type information element, and
the information indicating that the CSN should establish a single PDN connection consists of an EPS attach type value contained within the EPS attach type information element.

32. The CSN of claim 28, wherein
the data processing system is further configured such that, in response to the CSN receiving from the WCD the Attach Request message indicating that the CSN should not establish any PDN connection for the WCD, the data processing refrains from establishing a PDN connection in response to the Attach Request message, and
the data processing system is further configured such that, in response to the CSN receiving from the WCD a PDN Request message, the data processing system establishes a single CIoT PDN connection for the WCD using default parameters.

* * * * *